(12) United States Patent
Kikuchi et al.

(10) Patent No.: US 8,261,854 B2
(45) Date of Patent: Sep. 11, 2012

(54) RECIPROCATING TOOL

(75) Inventors: Atsuyuki Kikuchi, Hitachinaka (JP);
Tsukasa Suzuura, Hitachinaka (JP);
Hiroshi Haga, Hitachinaka (JP);
Kuniaki Kanbe, Hitachinaka (JP);
Tomoya Ikeda, Hitachinaka (JP)

(73) Assignee: Hitachi Koki Co., Ltd, Tokyo (JP)

( * ) Notice: Subject to any disclaimer, the term of this patent is extended or adjusted under 35 U.S.C. 154(b) by 402 days.

(21) Appl. No.: 12/530,609

(22) PCT Filed: Apr. 30, 2008

(86) PCT No.: PCT/JP2008/058595
§ 371 (c)(1),
(2), (4) Date: Sep. 9, 2009

(87) PCT Pub. No.: WO2008/140030
PCT Pub. Date: Nov. 20, 2008

(65) Prior Publication Data
US 2010/0038105 A1    Feb. 18, 2010

(30) Foreign Application Priority Data

May 1, 2007   (JP) ................................. 2007-120613
Aug. 27, 2007 (JP) ................................. 2007-220327
Aug. 27, 2007 (JP) ................................. 2007-220328

(51) Int. Cl.
*B25D 17/24*   (2006.01)

(52) U.S. Cl. ...................... 173/211; 173/109; 173/162.1; 173/205

(58) Field of Classification Search .................. 173/201, 173/10, 210, 211, 162.1, 162.2, 48, 104, 173/109, 205; 30/392, 393
See application file for complete search history.

(56) References Cited

U.S. PATENT DOCUMENTS

| 4,726,430 A | 2/1988 | Hendrikx et al. |
| 5,025,562 A | 6/1991 | Palm |
| 5,052,497 A * | 10/1991 | Houben et al. ................. 173/109 |
| RE33,733 E | 11/1991 | Hendrikx et al. |

(Continued)

FOREIGN PATENT DOCUMENTS

EP    0 075 877 B1    12/1986

(Continued)

OTHER PUBLICATIONS

Japanese Patent Office (JPO) office action for Japanese Patent Application No. 2007-120613, mailed on Mar. 26, 2012, 7 pages.

(Continued)

*Primary Examiner* — Scott A. Smith
(74) *Attorney, Agent, or Firm* — Kilpatrick Townsend & Stockton LLP

(57) ABSTRACT

A reciprocating tool (1) includes a housing (20, 30), a driving source (21), a reciprocation conversion unit (34, 36), —and a vibration reduction mechanism (30). The driving source is accommodated in the" housing. The reciprocation conversion unit (34, 36) is supported by the housing and is configured to convert a driving force of the driving source into a reciprocating motion for providing a tool bit (16) movably supported to the housing with a reciprocating motion. The vibration reduction mechanism (70) includes a shaft (72), a weight (71), a support member (73), and a urging portion (74). The shaft i(72)s supported by the housing and extending in a direction perpendicular to directions of the reciprocating motion of the tool bit (41) t and has an axis. The weight (71) is located away from the shaft (72) and is swingable in a swinging direction. The support member (73) swingably supports the weight (71) about the axis of the shaft (72). The urging portion (74) urges the weight (71) toward a prescribed position of the weight in the swinging direction with respect to the housing.

26 Claims, 11 Drawing Sheets

U.S. PATENT DOCUMENTS

| | | | | |
|---|---|---|---|---|
| 5,555,626 A * | 9/1996 | Fuchs | | 30/393 |
| 6,112,830 A | 9/2000 | Ziegler et al. | | |
| 6,286,217 B1 * | 9/2001 | Dassoulas et al. | | 30/392 |
| 6,634,107 B2 * | 10/2003 | Osada | | 30/392 |
| 7,383,895 B2 * | 6/2008 | Aoki | | 173/201 |
| 7,451,833 B2 * | 11/2008 | Hahn | | 173/104 |
| 7,513,317 B2 * | 4/2009 | Satou | | 173/162.2 |
| 7,637,018 B2 * | 12/2009 | Zhang | | 30/392 |
| 2006/0096104 A1 | 5/2006 | Neitzell et al. | | |
| 2007/0074408 A1 | 4/2007 | Zhang | | |

FOREIGN PATENT DOCUMENTS

| | | |
|---|---|---|
| EP | 0 206 348 B1 | 10/1989 |
| EP | 1 637 289 A1 | 3/2006 |
| EP | 1 736 283 A2 | 12/2006 |
| GB | 2 129 733 A | 5/1984 |
| JP | S60-14182 A | 7/1985 |
| JP | H04-217418 | 8/1992 |
| JP | 2002-079417 A | 3/2002 |
| JP | 2006-021261 A | 1/2006 |
| JP | 2006-062039 A | 3/2006 |

OTHER PUBLICATIONS

Japanese Patent Office (JPO) office action for Japanese Patent Application No. 2007-220327, mailed on Mar. 26, 2012, 7 pages.

* cited by examiner

US 8,261,854 B2

RECIPROCATING TOOL

TECHNICAL FIELD

The present invention relates to a reciprocating tool, more particularly, to a reciprocating tool that has a vibration reduction mechanism.

BACKGROUND ART

Reciprocating tools (electrical tools) that have a vibration reduction mechanism known as dynamic vibration absorber, have been proposed. The electric tool includes a housing, a working tool, a motor, a reciprocation conversion unit, and a striking mechanism. The working tool can reciprocate with respect to the housing. The motor, the reciprocation conversion unit, and the striking mechanism are provided in the housing. A handle is fixed to the back of the housing. A cylinder is provided on the lower part of the housing. The cylinder serves as vibration control chamber.

In the vibration control chamber, a guide bar is provided. The guide bar extends parallel to the direction in which the working tool reciprocates. A first weight is mounted on the guide bar. The first weight is inserted into a first through hole of a second weight. The second weight is inserted into a second through hole of a third weight. One ends of three springs abut on both ends of each weight, respectively. The other ends of the springs abut on a part of the housing that constitutes the vibration control chamber.

With this structure, the first to third weights slide on one another along the guide bar, with respect to the housing, due to the vibration generated by the reciprocating motion of the working tool. Therefore, the vibration can be reduced. A reciprocating tool of such a configuration is disclosed in, for example, Japanese Patent Application Publication No. S52-109673.

DISCLOSURE OF THE INVENTION

In the conventional reciprocating tool described above, the first weight slides on the guide bar and the first to third weights slide on one another. Inevitably, the sliding resistance is so large that the first to third weights cannot slide sufficiently. Consequently, the vibration generated by the reciprocating motion of the working tool can hardly be reduced sufficiently.

The conventional reciprocating tool described above includes the cylinder and the shaft. The cylinder holds the weights and the springs, and shaft passes through the weights and springs. Thus, the weights and springs are set in coaxial alignment and can move linearly. Accordingly, the use of the cylinder and the shaft leads an expensive reciprocating tool.

In the conventional reciprocating tool, the first to third weights and the springs are independent parts. Therefore, disassembling, repair and reassembling of the vibration reduction mechanism have been difficult.

Accordingly, an object of the present invention is to provide a reciprocating tool having a vibration reduction mechanism that is capable of being inexpensive, is capable of sufficiently reducing vibration, and is capable of prolonging service life.

Another object of the present invention is to provide a reciprocating tool having a vibration reduction mechanism that is easy to disassemble, repair and reassemble.

In order to attain the above and other objects, the present invention provides a reciprocating tool including a housing, a driving source, a reciprocation conversion unit, and a vibration reduction mechanism. The driving source is accommodated in the housing. The reciprocation conversion unit is supported by the housing and is configured to convert a driving force of the driving source into a reciprocating motion for providing a tool bit movably supported to the housing with a reciprocating motion. The vibration reduction mechanism includes a shaft, a weight, a support member, and an urging portion. The shaft is supported by the housing and extending in a direction perpendicular to directions of the reciprocating motion of the tool bit and has an axis. The weight is located away from the shaft and is swingable in a swinging direction. The support member swingably supports the weight about the axis of the shaft. The urging portion urges the weight toward a prescribed position of the weight in the swinging direction with respect to the housing.

With this structure, a sliding resistance generates only between the support member and the shaft, while the weight swings. Thus, the sliding resistance that develops as the weight moves with respect to the housing can be reduced. Accordingly, the weight can be swung sufficiently as a result of the vibration of the reciprocating tool generated by the reciprocating motion of the tool bit, thereby reducing the vibration of the reciprocating tool sufficiently. Moreover, a durability of the reciprocating tool can be improved due to the low sliding resistance.

In addition, a distance the support member moves can be reduced, and the space in which the support member moves can therefore be reduced. Furthermore, the urging portion may be provided not to project from both ends of the weight in the swinging direction.

Preferably, a pair of the vibration reduction mechanisms are provided. The pair of the vibration reduction mechanisms is positioned symmetrically to each other with respect to an axis of the tool bit.

With this structure, the pair of vibration reduction mechanisms can reduce the vibration of the reciprocating tool generated by the reciprocating motion of the tool bit, because the pair of vibration reduction mechanisms is provided symmetrical to each other with respect to the axis of the tool bit.

Preferably, a swing-range restricting portion is capable of restricting a swing angle range of the weight in a swing direction of the weight.

With this structure, the excessively swing (the swing range in the swinging direction) of the weight can be restricted reliably and easily, thereby avoiding the deformation and damage of the urging portion.

Preferably, the support member has one end portion movable about the axis of the shaft and another end portion connected to the weight. The support member and the weight are integrally swingable. The swing-range restricting portion includes a first contact member made of a resilient material and capable of preventing the weight and the support member from swinging beyond a first predetermined angle upon abutment of the one end portion on the first contact member.

With this structure, the first elastic member function as swing-range restricting member for preventing the weight and the support member from swinging beyond the first predetermined angle.

Preferably, the swing-range restricting portion includes a pair of second contact members. Each second contact member is provided on each end of the weight in the swinging direction. Each of the second contact members abuts on the housing when the weight swings by a second predetermined angle.

With this structure, since the second contact members abut the housing when the weight swings by the second predetermined angle, the excessively swing (the swing range in the swing direction) of the weight can be restricted reliably and easily. If the second contact members are made of resilient material, the impact force of the second contact members can be buffered when the second contact members strongly hit the housing, thereby avoiding the breakage and deformation of the housing, and vibration by hit of the second contact members.

Preferably, the urging portion includes a pair of leaf springs each having one end and another end. The one end of the leaf spring is capable of contacting the weight. The another end of the leaf spring is fixed to the housing.

With this structure, the vibration reduction mechanism does not occupy so large a space as in the case where the mechanism includes springs. Therefore, the reciprocating tool can have a compact size.

Preferably, the axis of the shaft is spaced apart from a gravity center of the reciprocating tool.

With this structure, the weight can be greatly vibrated as a result of the vibration of the reciprocating tool generated by reciprocating motion of the tool bit, thereby reducing the vibration of the reciprocating tool effectively.

Preferably, a striking mechanism is provided between the tool bit and the vibration reduction mechanism and a handle is provided on the housing. The vibration reduction mechanism is positioned between the striking mechanism and handle.

With this structure, the vibration of the reciprocating tool generated by the reciprocating motion of the tool bit can be effectively reduced.

Preferably, the driving source includes a motor having an output shaft. The reciprocation conversion unit includes a crank shaft, a crank weight, a crank pin, and a connecting rod. The crank shaft extends parallel to the output shaft. The crank weight rotates with a rotation of the crank shaft. The crank pin rotates about the crank shaft with a rotation of the crank weight. The connecting rod has one end connected to the crank pin and another end capable of reciprocating in the directions of the reciprocating motion. The crank shaft is positioned between the output shaft and the striking mechanism.

With this structure, since the crank shaft is located between the output shaft and the striking mechanism, a dead space is formed between the handle and the reciprocation conversion unit. The vibration reduction mechanism can be provided in this dead space. Thus, the space in the housing can be used efficiently.

Preferably, the support member is swingably supported to the shaft.

With this structure, since the support member is swingably supported to the shaft, the vibration reduction mechanism can easily be assembled by forming a hole in the support member for being passed through the shaft. Furthermore, the vibration reduction mechanism can be simple in structure, because the support member can swing about the shaft without using bearings.

Preferably, the weight is positioned on or near an imaginary line extending from a locus of the reciprocating motion of the tool bit.

With this structure, Moreover, the vibration of the reciprocating tool caused by the reciprocating motion of the tool bit can be effectively reduced, because the weight swings on or near the imaginary line extending from the locus of the reciprocating motion of the tool bit.

Preferably, the urging portion includes a pair of leaf springs each having a restricted part, a contact part, and a deformable part. The restricted part is fixed to the housing, is motion-restricted by the housing and has one end portion connected to the deformable part. The contact part is capable of contacting the weight. The deformable part is interposed between the restricted part and the contact part. The deformable part includes a small-width region having a width, in an axial direction of the shaft, smaller than that of the one end portion of the restricted part.

This structure can ensure the strength of the each leaf spring while avoiding an increase in the length thereof and can yield a small spring constant.

Preferably, the small-width region has a width gradually narrower toward the contact part.

With this structure, the stress concentration in the small-width region can be avoided when each leaf spring is deformed.

Preferably, the deformable part further includes a large-width region having a width, in the axial direction of the shaft, broader than that of the one end portion of the restricted part. The small-width region is interposed between the large-width region and the contact part.

With this structure, the stress is uniformly distributed in the entire edge of the leaf spring. This prevents the leaf spring from being broken at the edge thereof. The lifetime of the leaf spring can therefore be prolonged.

Preferably, the contact part has a width in the axial direction of the shaft broader than that of the small-width region.

With this structure, the surface pressure between the contact part and the weight can be reduced while the contact part slides on the weight. This suppresses the wearing of not only the contact part, but also the weight.

Preferably, the housing includes a storage section accommodating the vibration reduction mechanism, and a cover detachably provided and covering the storage section. The vibration reduction mechanism is detachable with respect to the storage section through the cover.

With this structure, since the cover is the sole component that surrounds the vibration reduction mechanism, the vibration reduction mechanism is easy to detach from the reciprocating tool. This renders the vibration reduction mechanism easy to disassemble, repair and reassemble.

Preferably, the vibration reduction mechanism is modularized.

With this structure, the vibration reduction mechanism can be treated an assembly and can be attached to, and detached from the reciprocating tool. Accordingly, the vibration reduction mechanism can be easy to disassemble, repair and reassemble.

Preferably, the housing includes a crank cover covering the reciprocation conversion unit and integrally formed with the cover.

With this structure, since the crank cover can cover the reciprocation conversion unit and the vibration reduction mechanism, the reciprocating tool can be reduce number of parts.

Preferably, the housing includes a crank case supporting the reciprocation conversion unit and made of a rigid material. The crank case includes the storage section.

With this structure, the weight and the support member can stably swing, because the vibration reduction mechanism is fixed to the storage section of the crank case that is made from rigid material.

In another aspect of the present invention, there is provided a reciprocating tool includes a housing, a driving source, a reciprocation conversion unit, and a vibration reduction mechanism. The driving source is accommodated in the housing. The reciprocation conversion unit is supported by the housing and is configured to convert a driving force of the driving source into a reciprocating motion for providing a tool bit movably supported to the housing with a reciprocating motion. The vibration reduction mechanism acts by a vibration of the housing as a result of the reciprocating motion of the reciprocation conversion unit. The housing includes a storage section accommodating the vibration reduction mechanism, and a cover detachably provided and covering the storage section. The vibration reduction mechanism is detachable with respect to the storage section through the cover.

Preferably, the vibration reduction mechanism is modularized.

Preferably, the housing includes a crank cover covering the reciprocation conversion unit and integrally formed with the cover.

Preferably, the housing includes a crank case supporting the reciprocation conversion unit and made of a rigid material. The crank case includes the storage section.

Figure 1:
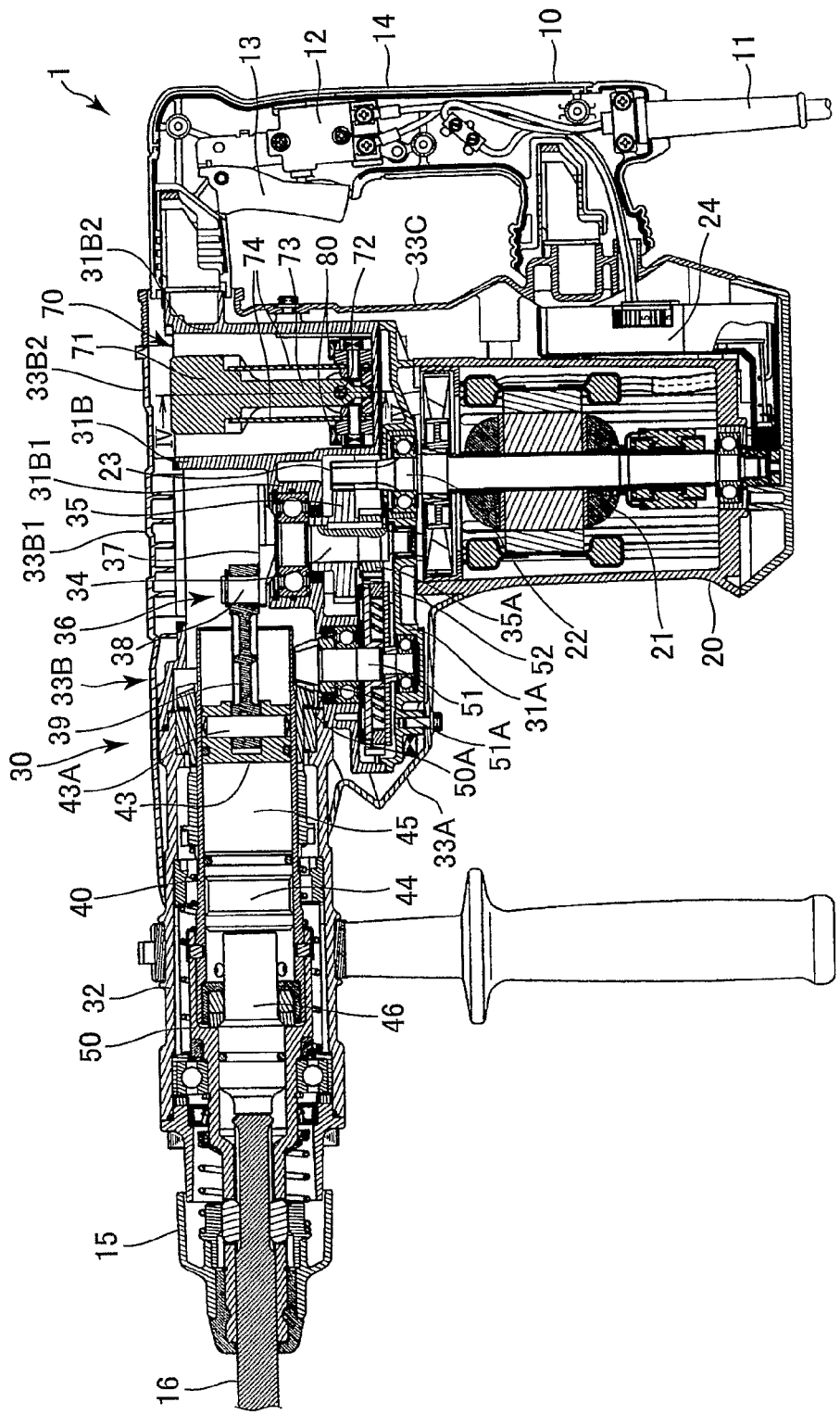
FIG. 1 is a cross-sectional view showing a reciprocating tool (impact tool) according to a first embodiment of the present invention.

BRIEF DESCRIPTION OF REFERENCE NUMERALS 1, 101, 201: impact tool
20: motor housing
21: electrical motor
22: output shaft
30: gear housing
31A: gear cover
31B: crank case
31B1: crank supporting section
31B2: storage section
32: cylinder case
33A: hood
33B: crank cover
33B1: main cover section
33B2: extension section
33C: back cover
36: motion conversion mechanism
37: crank weight
38: crank pin
39: connecting rod
44: striking member
46: intermediate member
70, 170: vibration reduction mechanism
71, 171: weight
72: shaft
73, 173: support member
73A: extension part
74, 274: leaf spring
74a, 274a: contact part
74b, 274b: deformable part
74b1, 274b1: small-width region
74b2: large-width region
74c, 274c: root part
74d, 274d: fixed part
75: elastic member
77: clamp member
79: leaf-spring supporting member
131A: swing restricting member
172: support shaft

DETAILED DESCRIPTION OF THE PREFERRED EMBODIMENTS

A reciprocating tool according to a first embodiment of the present invention will be described while referring to FIGS. 1 through 7. The reciprocating tool of the first embodiment is applied to an impact tool 1. In FIG. 1, the left side will be described as the front side of the impact tool 1 and the right side will be described as the back side of the impact tool 1. The impact tool 1 includes a casing having a handle 10, a motor housing 20, and a gear housing 30 connected with one another.

A power cable 11 is attached to the handle 10. The handle 10 houses a switch mechanism 12. A trigger 13 that can be manipulated by the user is mechanically connected to the switch mechanism 12. The switch mechanism 12 is connected to an external power source (not shown) through the power cable 11. By operating the trigger 13, an electrical motor 21 described later can be connected to and disconnected from the external power source. Also, the handle 10 includes a grip 14 that is gripped by the user when the impact tool 1 is used.

The motor housing 20 is positioned at a lower front side of the handle 10. The electrical motor 21 is accommodated in the motor housing 20. The electrical motor 21 includes an output shaft 22 that outputs a driving force of the electrical motor 21. A pinion gear 23 is provided on the end of the output shaft 22 and is positioned in the gear housing 30. A control unit 24 for controlling a rotation speed of the electrical motor 21 is located on the motor housing 20 behind the electrical motor 21.

Figure 2:
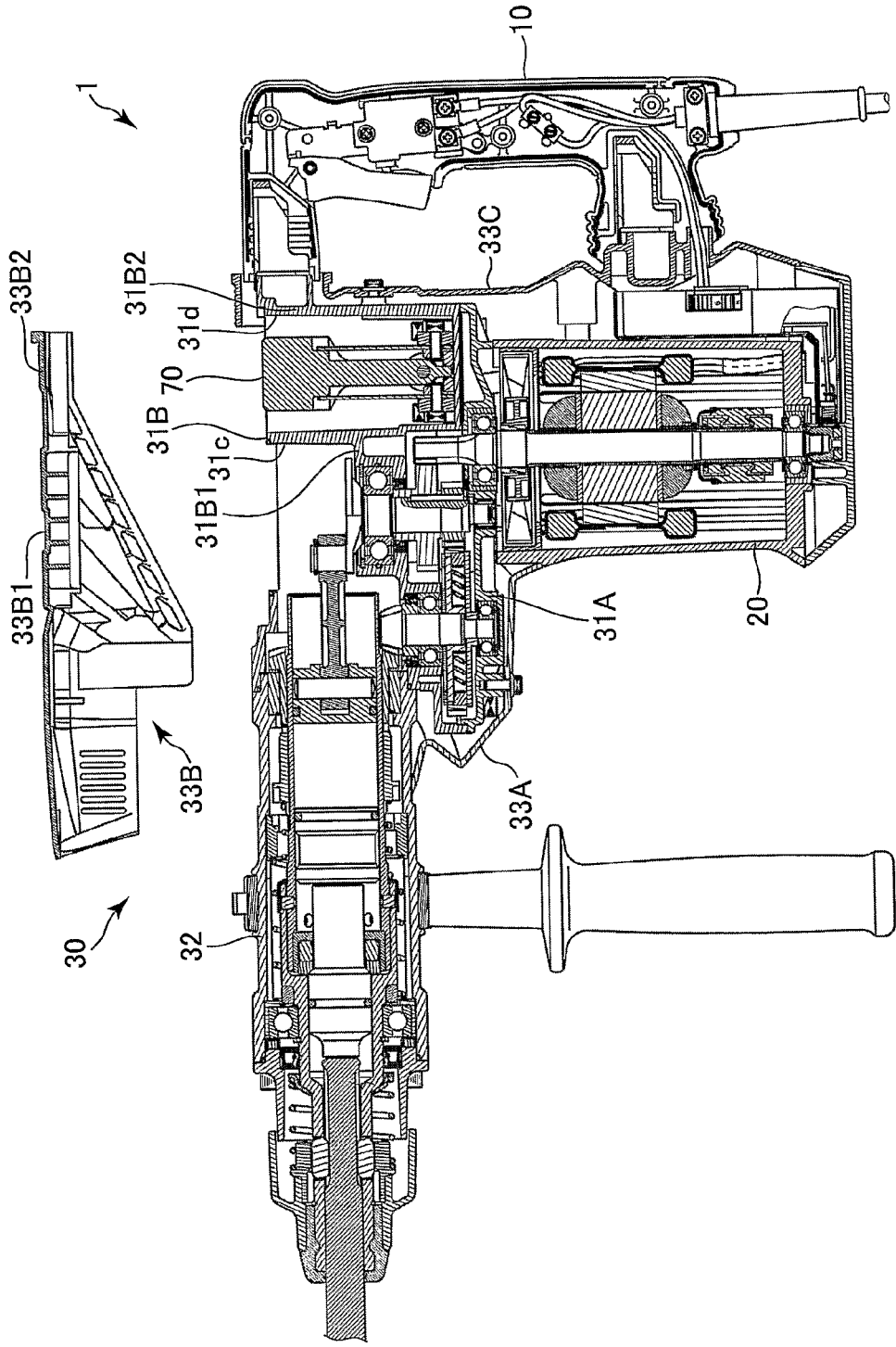
FIG. 2 is a cross-sectional view showing the reciprocating tool according to the first embodiment of the invention, with a crank cover removed from the reciprocating tool.

As shown in FIGS. 1 and 2, the gear housing 30 includes a gear cover 31A, a crank case 31B, a cylinder case 32, a hood 33A, a crank cover 33B, and a back cover 33C. The gear cover 31A is arranged above the motor housing 20. The crank case 31B is arranged above the gear cover 31A. The rear end of the crank case 31B is connected to the handle 10. The crank case 31B is made of aluminum (high-hardness material) and has a crank supporting section 31B1 and a storage section 31B2. The crank supporting section 31B1 supports a reciprocation conversion unit described later. The storage section 31B2 holds a vibration reduction mechanism 70 described later. As shown in FIG. 2, the crank supporting section 31B1 and storage section 31B2 are formed with a first opening 31c and a second opening 31d, respectively. Through the first opening 31c, components, such as a motion conversion mechanism 36 and a piston 43 (both will be described later) can be replaced with new ones, and oil can be supplied to these components. The cylinder case 32 is located at the front end of the crank case 31B.

The hood 33A covers the gear cover 31A and the lower part of the crank case 31B to constitute an outer shell. The crank cover 33B is detachably provided on the crank case 31B with bolts 33D (see FIGS. 7A and 7B), from above the crank case 31B. The crank cover 33B is an outer shell member that covers the reciprocation conversion unit (described later). The crank cover 33B is made of resin and includes a main cover section 33B1 and an extension section 33B2. The extension section 33B2 extends from the rear end of the main cover section 33B1 toward the handle 10. The main cover section 33B1 covers the first opening 31c (reciprocation conversion unit). The extension section 33B2 covers the second opening 31d (vibration reduction mechanism 70). The back cover 33C is secured at the back of the motor housing 20 and crank case 31B. The lower end of the back cover 33C is connected to the handle 10.

A crank shaft 34 that extends parallel to the output shaft 22 is rotatably supported on the front side of the pinion gear 23 in the gear cover 31A and the crank supporting section 31B1 of the crank case 31B. A first gear 35 that is meshingly engaged with the pinion gear 23 is coaxially fixed to the lower side of the crank shaft 34. Further, a gear 35A is coaxially fixed to the lower end of the crank shaft 34. The motion conversion mechanism 36 is provided at the upper side of the crank shaft 34. The motion conversion mechanism 36 has a crank weight 37, a crank pin 38, and a connecting rod 39. The crank weight 37 is fixed to the upper end of the crank shaft 34. The crank pin 38 is fixed to the end portion of the crank weight 37 and is inserted into the rear end of the connecting rod 39. The crank shaft 34 and the motion conversion mechanism 36 correspond to the above-mentioned reciprocation conversion unit. The reciprocation conversion unit is supported by the crank supporting section 31B1.

A rotation transmission shaft 51 extending parallel to the crank shaft 34 is rotatably supported on the front side of the gear 35A in the gear cover 31A and the crank supporting section 31B1 of the crank case 31B. A second gear 52 that is meshingly engaged with the gear 35A is coaxially fixed to the lower end of a rotation transmission shaft 51. A first bevel gear 51A is coaxially fixed to the upper end of the rotation transmission shaft 51.

A cylinder 40 extending in a direction perpendicular to the output shaft 22 is provided in the front part of the crank case 31B and in the cylinder case 32. The center axis of the cylinder 40 and the rotation axis of the output shaft 22 are positioned on a same plane. A piston 43 is provided in the cylinder 40 and is slidably provided along the inner periphery of the cylinder 40. The piston 43 reciprocates in the axial direction of the cylinder 40. The piston 43 includes a piston pin 43A that is inserted into the front end of the connecting rod 39. A striking member 44 is provided in the front section of the cylinder 40 and is slidably provided along the inner periphery of the cylinder 40 in the axial direction thereof. An air chamber 45 is formed among the cylinder 40, the piston 43, and the hammer 44.

A rotating cylinder 50 is rotatably supported in the hammer housing 32. The rotating cylinder 50 surrounds the front section of the outer perimeter of the cylinder 40. The rotating cylinder 50 extends forward of the cylinder 40, and a tool support portion 15 is provided at the end of the rotating cylinder 50 and is capable of attaching or detaching a working tool 16. A second bevel gear 50A that is meshingly engaged with the first bevel gear 51A is provided on the rear end portion of the rotating cylinder 50. The center axis of the rotating cylinder 50 and the rotation axis of the output shaft 22 are positioned on a same plane. Also, an intermediate member 46 is provided in the front side of the striking member 44 and is slidably provided against the rotating cylinder 50. The intermediate member 46 reciprocates in the axial direction of the rotating cylinder 50.

Figure 3:
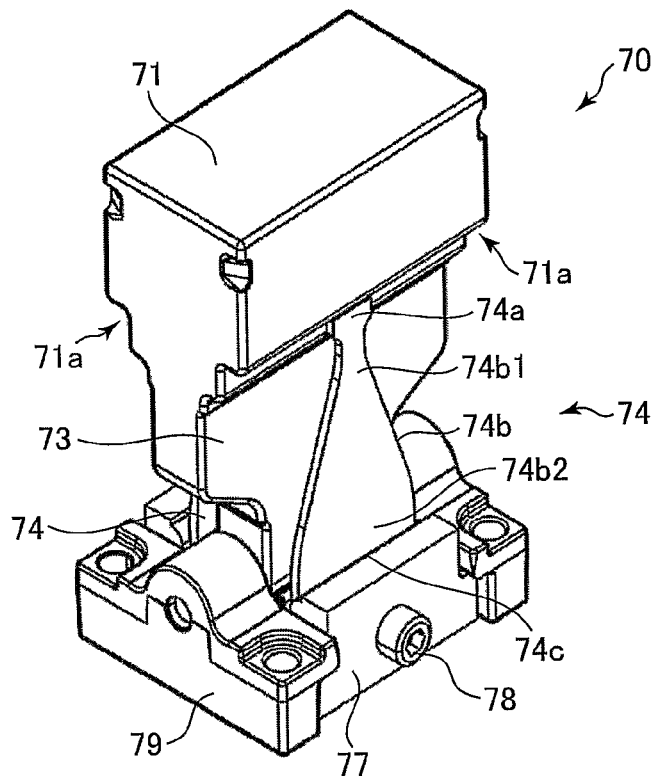
FIG. 3 is a perspective view showing a vibration reduction mechanism of the reciprocating tool according to the first embodiment of the invention.
Figure 4:
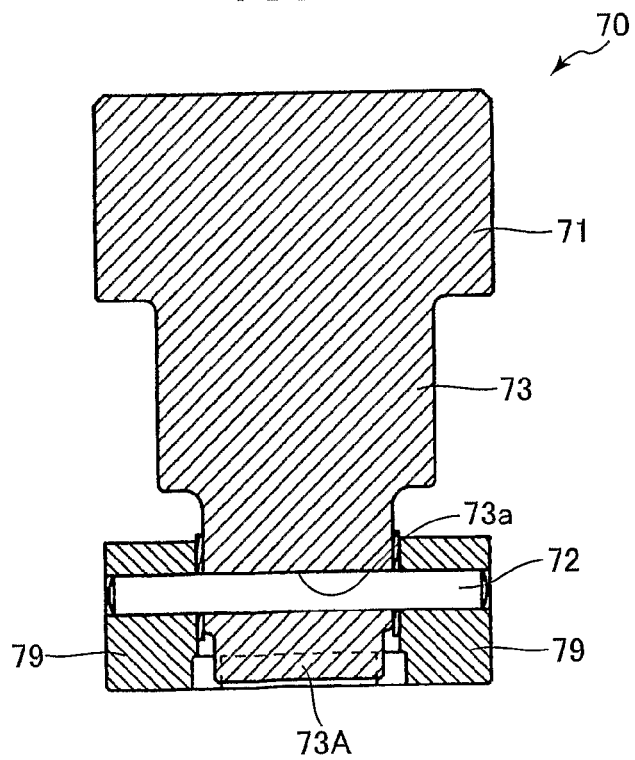
FIG. 4 is a cross-sectional view showing the vibration reduction mechanism, taken along line IV-IV in FIG. 1.

The vibration reduction mechanism 70 (vibration absorber) is provided in the storage section 31B2 and in opposition to the handle 10. The vibration reduction mechanism 70 will be described in detail with reference to FIG. 3 through FIG. 7. FIG. 3 is a perspective view of the vibration reduction mechanism 70. FIG. 4 is a cross-sectional view of the vibration reduction mechanism 70, taken along line IV-IV in FIG. 1. As shown in FIG. 3 through FIG. 5, the vibration reduction mechanism 70 mainly includes a weight 71, a shaft 72, a support member 73, a pair of leaf springs 74, a clamp member 77, and a leaf-spring supporting member 79.

As shown in FIGS. 4 and 5, the shaft 72 has a circular cylindrical shape. The shaft 72 is fixed at its both ends to the leaf-spring supporting member 79. The axis of the shaft 72 extends perpendicular to the directions (back-and-forth directions) for the reciprocating motion of the piston 43. In other words, the shaft 72 extends along a line perpendicular to the plane of the figure. The axis of the shaft 72 is spaced apart from the gravity center of the impact tool 1. The weight 71 is located away from the shaft 72 in the radial direction thereof. The weight 71 is positioned between the striking mechanism (the piston 43, striking member 44 and intermediate member 46) and is positioned on or near an imaginary line extending from the locus of the reciprocating motion of the working tool 16, while the weight 71 and the support member 73 is swinging about the shaft 72, as will be descried later. A stepped part 71A is provided at the lower part of the weight 71.

As shown in FIGS. 4 and 5, the lower end portion (one end portion) of the support member 73 is formed with a through hole 73a. The shaft 72 is inserted into the through hole 73a. The upper end portion (another end portion) of the support member 73 is connected to, and formed integral with, the weight 71. Therefore, the support member 73 is swingably supported by the shaft 72. As the support member 73 swings about the axis of the shaft 72, the weight 71 swings together with the support member 73, about the axis of the shaft 72.

Figure 5B:
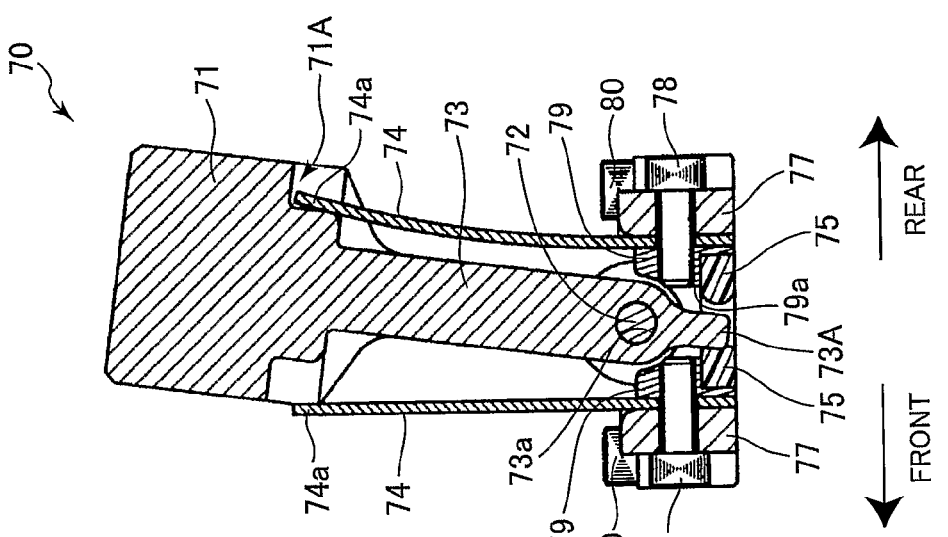
FIGS. 5A to 5C are cross-sectional views explaining an operation of the vibration reduction mechanism of the reciprocating tool according to the first embodiment of the invention, FIG. 5A being a cross-sectional view showing the weight staying at a prescribed position, FIG. 5B being a cross-sectional view showing the weight rotated in one direction of vibration, and FIG. 5C being a cross-sectional view showing the weight vibrated in the other direction of vibration.
Figure 5A:
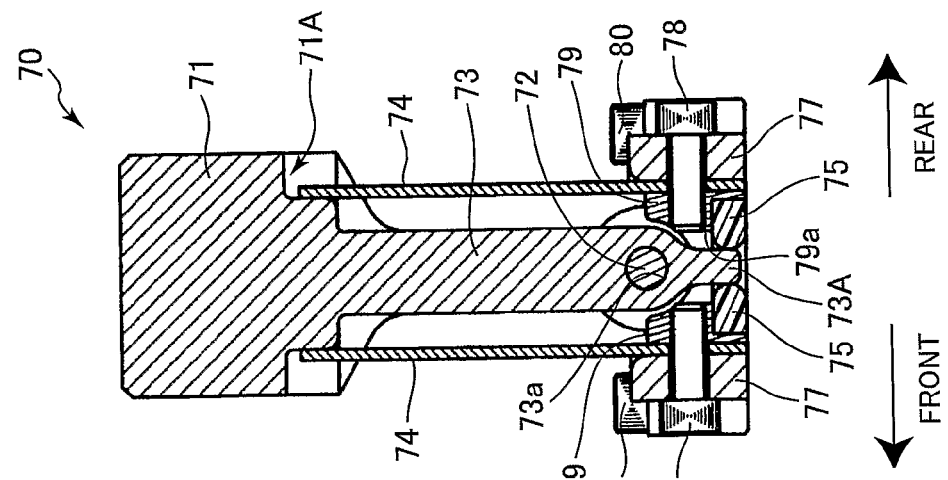

As shown in FIG. 5A, the support member 73 has an extension part 73A, which passes through an insertion hole 79a formed in the leaf-spring supporting member 79. The extension part 73A is positioned the lower section of the support member 73 and extends in a direction opposite to the direction in which the support member 73 extends from the shaft 72 toward the weight 71. A pair of elastic members 75 are provided at positions opposing the extension part 73A in the left-to-right direction of FIGS. 5A to 5C (i.e., front-to-rear direction).

Figure 6:
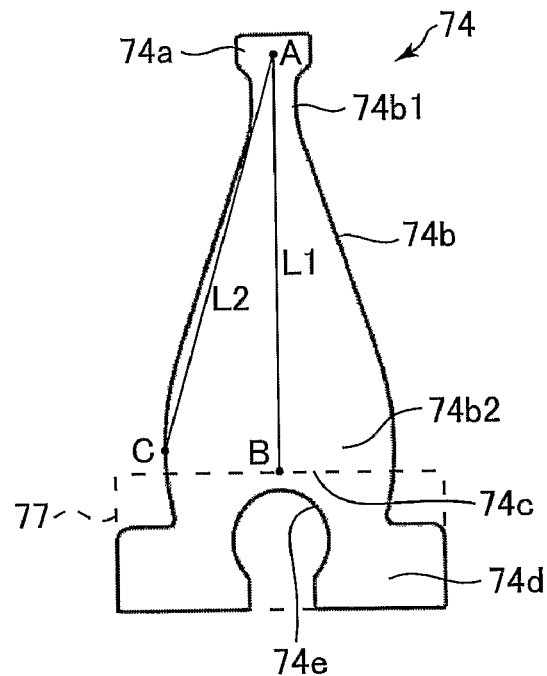
FIG. 6 is a front view of a leaf spring of the vibration reduction mechanism of the reciprocating tool according to the first embodiment of the present invention.

As shown in FIGS. 3 and 5A, the leaf springs 74 are arranged substantially parallel to each other. As shown in FIG. 6, each of the leaf springs 74 has a contact part 74a, a deformable part 74b, a root part 74c, and a fixed part 74d. The contact part 74a is capable of contacting a side surface extending almost vertically, of the stepped part 71A of the weight 71. The deformable part 74b has a small-width region 74b1 and a large-width region 74b2. The large-width region 74b2 is positioned closer to the fixed part 74d than the small-width region 74b1. The fixed part 74d is formed with a notch 74e. The root part 74c and the fixed part 74d are clamped between the clamp member 77 and the leaf-spring supporting member 79 by passing a bolt 78 through the notch 74e and the clamp member 77. As a result, motion of the root part 74c and the fixed part 74d are restricted. Thus, the root part 74c and the fixed part 74d function as restricted members. The root part 74c opposes the upper end of the clamp member 77.

The small-width region 74b1 is narrower than the root part 74c in the axial direction of the shaft 72 (i.e., left-to-right direction in FIG. 6). The large-width region 74b2 is broader than the root part 74c in the axial direction of the shaft 72 (i.e., left-to-right direction in FIG. 6). The contact part 74a is broader than the edge of the small-width region 74b1, which is connected to the contact part 74a, in the axial direction of the shaft 72 (i.e., left-to-right direction in FIG. 6). The small-width region 74b1 is gradually narrower from the large-width region 74b2 toward the contact part 74a. As shown in FIG. 6, distance L1 between point A on the contact part 74a and point B on the root part 74c is approximately equal to distance L2 between point A and point C on the large-width region 74b2. A portion passing point C, of the large-width region 74b2 in the axial direction of the shaft 72 has the broadest width in the large-width region 74b2.

Figure 7A:
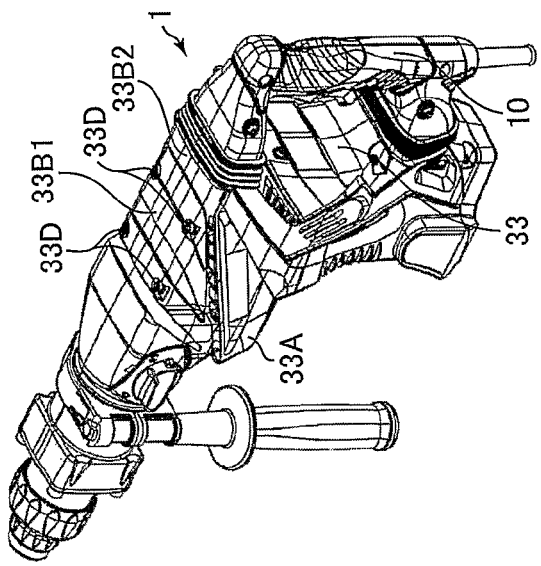
FIGS. 7A to 7C are rear perspective views explaining a method of removing the vibration reduction mechanism from the reciprocating tool according to the first embodiment of the present invention, FIG. 7A showing the reciprocating tool not disassembled the crank cover yet, FIG. 7B showing the reciprocating tool with the crank cover removed, and FIG. 7C showing the reciprocating tool with the vibration reduction mechanism removed.
Figure 7B:
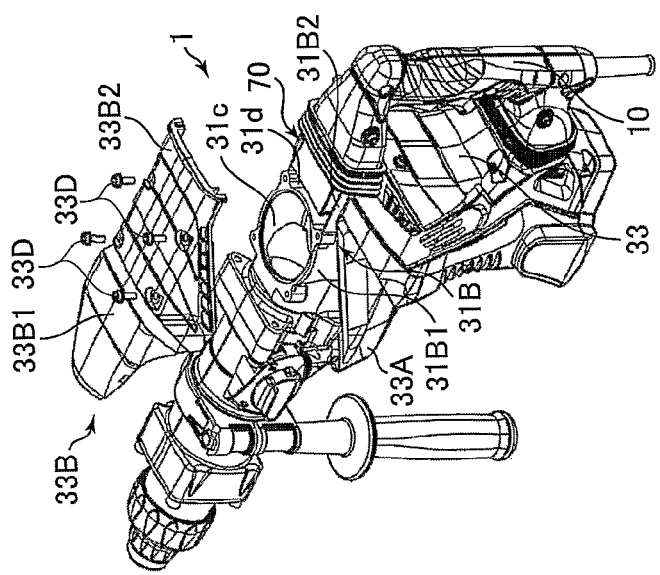
Figure 7C:
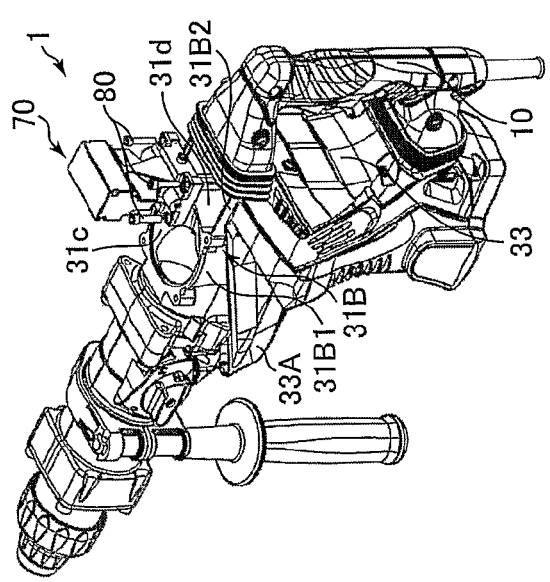

As described above, in the vibration reduction mechanism 70, the weight 71 and support member 73 are fixed to the leaf-spring supporting member 79 via the shaft 72, and the leaf springs 74 and clamp member 77 are fixed to the leaf-spring supporting member 79 via the bolt 78. Thus, the vibration reduction mechanism 70 is assembled in the form of a module. The modularized vibration reduction mechanism 70 is fixed to the storage section 31B2 when the leaf-spring supporting member 79 is fixed to the bottom of the storage section 31B2 by the bolt 80. As shown in FIGS. 7A to 7C, the vibration reduction mechanism 70 is attachable to and detached from the storage section 31B2 when the bolts 33D are removed, releasing the crank cover 33B.

Next, the operation of the impact tool 1 according to the first embodiment will be described. The working tool 16 is pressed against a workpiece (not shown) with the handle 10 gripped by the user. Next, the trigger 13 is pulled to supply power to and rotate the electrical motor 21. This rotation driving force is transmitted to the crank shaft 34 by way of the pinion gear 23 and the first gear 35. The rotation of the crank shaft 34 is converted into reciprocating motion of the piston 43 in the cylinder 40 by the motion converter mechanism 36 (the crank weight 37, the crank pin 38, and the connecting rod 39). The reciprocating motion of the piston 43 leads to repeated increments and decrements the pressure of the air in the air chamber 45, thereby causing a reciprocating motion of the striking member 44. The striking member 44 moves forward and collides with the rear end of the intermediate member 46, thereby applying an impact force to the working tool 16.

Also, the rotation driving force of the electrical motor 21 is transmitted to the rotation transmission shaft 51 by way of the pinion gear 23, first gear 35, crankshaft 34, gear 35A and second gear 52. The rotation of the rotation transmission shaft 51 is transmitted to the rotating cylinder 50 by way of the first bevel gear 51A and the second bevel gear 50A, resulting in rotation of the rotating cylinder 50. The rotation of the rotating cylinder 50 applies a rotation force to the working tool 16. The workpiece (not shown) is fractured by the rotation force and the impact force described above applied to the working tool 16.

During the operation of the impact tool 1 described above, a vibration with a roughly constant frequency resulting from the reciprocating motion of the striking member 44 (and working tool 16) is generated in the impact tool 1. The vibration is transmitted to the storage section 31B2 of the crank case 31B. The vibration is transmitted from the storage section 31B2 to the leaf-spring supporting member 79. As a result, the weight 71 and the support member 73 swing in the direction that the piston 43 reciprocates (i.e., front-to-rear direction). Since the weight 71 and the support member 73 swing, the vibration of the impact tool 1 can be effectively reduced, thereby improving the operation of the impact tool 1.

Next, the motion of the vibration reduction mechanism 70 while the impact tool 1 is operating will be described. As shown in FIG. 5B, the weight 71 and the support member 73 swing to the front side as a result of the vibration generated by the impact of the impact tool 1. At this point, the weight 71 swings to the left side against the resilient force (bias) of one leaf spring 74, which lies on the front side of the weight 71 (as shown in FIG. 5B), while the contact part 74a of this leaf spring 74 is abutting on the weight 71. Meanwhile, the extension part 73A swings to the rear side against the resilient force (bias) of one elastic member 75, which lies on rear side (as viewed in FIG. 5B). When the inclination of the weight 71 and support member 73 increases to a first predetermined angle, the weight 71 and support member 73 start swinging to the rear side (in FIG. 5B) because of the resilient forces of the one leaf spring 74 and the one elastic member 75.

Figure 5C:
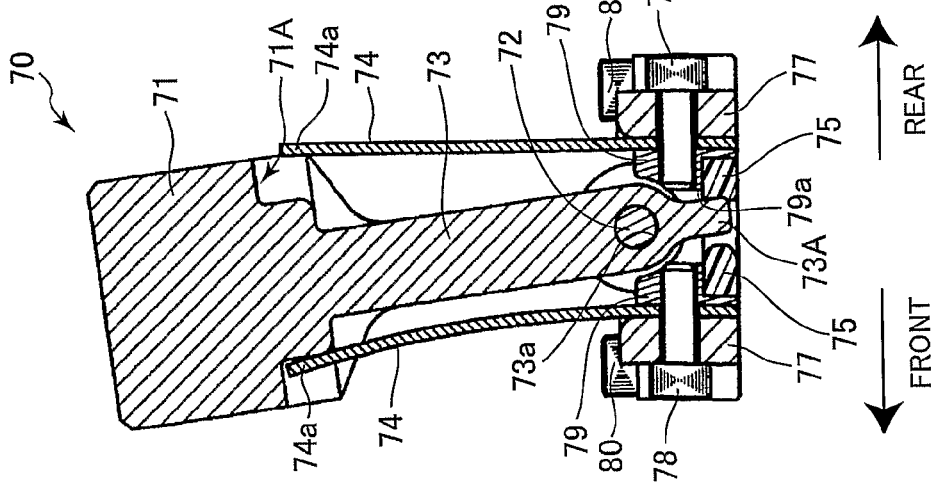

When the weight 71 and the support member 73 swing to the rear side (backwards) as shown in FIG. 5C, the weight 71 swings to the rear side against the resilient force of the other leaf spring 74, while the contact part 74a of the other leaf spring 74 is abutting on the weight 71. At the same time, the extension part 73A swings to the front side against the resilient force of the other elastic member 75 that lies on the front side (in FIG. 5C). When the inclination of the weight 71 and support member 73 increases to the first predetermined angle, the weight 71 and support member 73 start swinging to the front side (in FIG. 5C) because of the resilient forces of the other leaf spring 74 and the other first elastic member 75.

Thus, the pair of first elastic members 75 function as swing-restricting members for preventing the weight 71 and the support member 73 from swinging beyond the first predetermined angle. The first predetermined angle is the angle of the weight 71 and the support shaft 73, from their prescribed (initial) position, in which the weight 71 swings to reach the leftmost or rightmost the weight 71 shown in FIGS. 5A to 5C. The pair of leaf springs 74 urges the weight 71 and the support member 73 toward prescribed positions where the pair of leaf springs 74, the weight 71, and the support member 73 have such a positional relation as shown in FIG. 5A. The "prescribed positions" are positions where the weight 71 urged by the leaf springs 74 stays when the impact tool 1 is not operated, generating no vibration.

The impact tool 1 receives a large impact when the impact tool 1 falls onto a floor. The leaf springs 74 have their resilient force deceased due to a long-term use. In either case, the weight 71 may excessively swing. In this case, the weight 71 will abut on a part of the storage section 31B2 which opposes the weight 71 in a swinging directions thereof. Abutting on the part of the storage section 31B2, the excessively swing (the swing range in the swinging direction) of the weight 71 can be restricted reliably and easily, thereby avoiding the deformation and damage of the leaf springs 74.

As stated above, the vibration reduction mechanism 70 according to the first embodiment has the weight 71, shaft 72, support member 73 and leaf springs 74. The shaft 72 is fixed to the housing and extends perpendicular to the direction for the reciprocating motion of the working tool 16. The weight 71 is located away from the shaft 72. The weight 71 is swingably supported by the support member 73 about the shaft 72. The leaf springs 74 urge the weight 71 to return to the prescribed position with respect to the housing in the swinging directions of the weight 71. Hence, the sliding resistance generates only between the support member 73, which define the fulcrum for the swing of the weight 71, and the shaft 72, while the weight 71 swings. Thus, the sliding resistance that develops as the weight 71 moves with respect to the housing can be reduced. Accordingly, the weight 71 can be swung sufficiently as a result of the vibration of the impact tool 1 generated by the reciprocating motion of the working tool 16, thereby reducing the vibration of the impact tool 1 sufficiently. The vibration can therefore be fully reduced. Moreover, the durability of the impact tool 1 can be improved due to the low sliding resistance. In addition, the distance the support member 73 moves can be reduced, and the space in which the support member 73 moves can therefore be reduced.

Furthermore, the stepped parts 71A are provided at both edges of the weight 71 in the swinging directions, and the contact parts 74a of the leaf springs 74 contact the stepped parts 71A, respectively. Thus, the size of the vibration reduction mechanism 70 can be reduced in the swinging directions. The vibration reduction mechanism 70 can therefore be compact, thereby resulting a compact impact tool 1. Further, since the leaf springs 74 do not project from the ends of the weight 71 in the swinging directions unlike a spring engagement unit 171A described later in a second embodiment. Thus, the vibration reduction mechanism 70 can be smaller than a vibration reduction mechanism 170 of an impact tool 101 according to the second embodiment.

The lower section of the vibration reduction mechanism 70 that includes the elastic members 75, clamp member 77 and leaf-spring supporting member 79, which are arranged about the shaft 72, is shorter than the distance the weight 71 swings in the swinging directions (in the left-to-right direction in FIG. 5). Therefore, the vibration reduction mechanism 70 can have a compact size in the swinging directions of the weight 71.

The pair of elastic members 75 apply an urging force to the extension part 73A when the weight 71 and the support member 73 swing. Therefore, when the weight 71 swings in one direction of the swinging directions, the elastic members 75 can work to urge the weight 71 in the other direction opposite to the one direction. Moreover, the elastic members 75 can function as swing-restricting members for preventing one end of the support member 73 and the extension part 73A from further swinging beyond the position where the weight 71 is reversed.

The urging portion includes two leaf springs 74 which abut, at one end, respectively on the both ends of the weight 71 in the swinging directions, and which are supported, at the other, by the leaf-spring supporting member 79. The vibration reduction mechanism 70, including the urging portion, does not occupy so large a space as in the case where the vibration reduction mechanism 70 includes two leaf springs. Therefore, the impact tool 1 can have a compact size.

Since the axis of the shaft 72 is spaced apart from the gravity center of the impact tool 1, the weight 71 can be greatly vibrated as a result of the vibration of the impact tool 1 generated by reciprocating motion of the working tool 16, thereby reducing the vibration of the impact tool 1 effectively. Since, the vibration reduction mechanism 70 is positioned between the striking mechanism and the handle 10, the vibration of the impact tool 1 generated by the reciprocating motion of the working tool 16 can be effectively reduced.

Since the crank shaft 34 is located at the front side the output shaft 22, a dead space is formed between the handle 10 and the reciprocation conversion unit. The vibration reduction mechanism 70 is provided in this dead space. Thus, the space in the housing can be used efficiently. In addition, the vibration reduction mechanism 70 can easily be assembled, because the shaft 72 passes through the hole 73a formed in the support member 73 and the support member 73 can therefore swing about the shaft 72. Furthermore, the vibration reduction mechanism 70 can be simple in structure, because the support member 73 can swing about the shaft 72 without using bearings or the like. Moreover, the vibration of the impact tool 1 caused by the reciprocating motion of the working tool 16 can be effectively reduced, because the weight 71 swings on or near the imaginary line extending from the locus of the reciprocating motion of the working tool 16.

When the leaf springs 74 are deformed, no large stresses generate in the contact parts 74a, which are a free end each. On the other hand, a large stress generates in the root part 74c and fixed part 74d of each leaf spring 74, because the root part 74c and fixed part 74d are restricting regions clamped between the clamp member 77 and the leaf-spring supporting member 79. The small-width region 74b1 is provided on a contact part 74a side of the deformable part 74b and the large-width region 74b2 is provided on a root part 74c side of the deformable part 74b. Therefore, this structure can ensure the strength of the each leaf spring 74 while avoiding an increase in the length thereof and can yield a small spring constant. Further, the stress concentration in the small-width region 74b1 can be avoided when each leaf spring 74 is deformed, since the small-width region 74b1 is gradually narrower from the large-width region 74b2 toward the contact part 74a.

When each leaf spring 74 is deformed as the weight 71 swings, a larger stress is applied near the root part 74c that is clamped between the clamp member 77 and the leaf-spring supporting member 79, than in any other part of the leaf spring 74. More specifically, the largest stress is applied near the center (or near point B) of the root part 74c that is more restricted in motion than any other part. Generally, if the leaf spring 74 is broken due to the deforming stress, the breakage starts at the edge of the leaf spring 74 in most cases. Each leaf spring 74 may be broken at a part of the edge of the leaf spring 74 where the applied stress is the greatest, not at the center part of the root part 74c where the applied stress is the largest in the leaf spring 74. Generally, the applied stress is distributed in a leaf spring shaped like the leaf spring 74, such that the applied stress at any point depends on the distance from the point (the contact part 74a) of application of load for deforming the leaf spring 74. Thus, in the edge of the leaf spring 74, the largest stress is applied to the part that has a distance L2 from the contact part 74a. The distance L2 is equal to a distance L1 from the contact part 74a (point A) to the center part (point B). In other words, the largest stress is applied near the large-width region 74b2 (point C) that lies a little above the root part 74c (see FIG. 6). An edge part of the root part 74c can be deformed a little in the left-to-right direction in FIG. 6. Therefore, the stress applied to the edge part of the root part 74c is smaller than the stress applied near the large-width region 74b2 (point C). The portion passing point C, of the large-width region 74b2 where the largest stress is applied has the broadest width in the large-width region 74b2 according to the first embodiment. Therefore, the stress is uniformly distributed in the entire edge of the leaf spring 47. This prevents the leaf spring 47 from being broken at the edge thereof. The lifetime of the leaf spring 47 can therefore be prolonged.

The contact part 74a of the leaf spring 74 abuts on the weight 71 and slides on the weight 71 at a high cycle as the weight 71 swings. Further, the contact part 74a is broader than that the edge of the small-width region 74b1, which is connected to the contact part 74a. The surface pressure between the contact part 74a and the weight 71 can be reduced while the contact part 74a slides on the weight 71. This suppresses the wearing of not only the contact part 74a, but also the weight 71.

In the vibration reduction mechanism 70, the weight 71 and support member 73 are fixed to the leaf-spring supporting member 79 via the shaft 72, and the leaf springs 74 and clamp member 77 are fixed to the leaf-spring supporting member 79 via the bolt 78. Thus, the vibration reduction mechanism 70 is assembled in the form of the module. The vibration reduction mechanism 70 can be treated an assembly and can be attached to, and detached from, the impact tool 1, whenever necessary. Accordingly, the vibration reduction mechanism 70 can be easy to disassemble, repair and reassemble.

Moreover, as shown in FIGS. 7A to 7C, the vibration reduction mechanism 70 can be detached from the impact tool 1, merely by pulling the bolts 33D, thus removing the crank cover 33B from the impact tool 1 and then by pulling the bolt 80 used to fasten the vibration reduction mechanism 70 to the impact tool 1. Since the crank cover 33B is the sole component that surrounds the vibration reduction mechanism 70, the vibration reduction mechanism 70 is easy to detach from the impact tool 1. This renders the vibration reduction mechanism 70 easy to disassemble, repair and reassemble. Further, since the main cover section 33B1 of the crank cover 33B covers the first opening 31c, and the extension section 33B2 of the crank cover 33B covers the second opening 31d, the impact tool 1 can be reduce number of parts. Furthermore, the weight 71 and the support member 73 can stably swing, because the vibration reduction mechanism 70 is fixed to the storage section 31B2 of the crank case 31B that is made from aluminum (high-hardness material).

Figure 8:
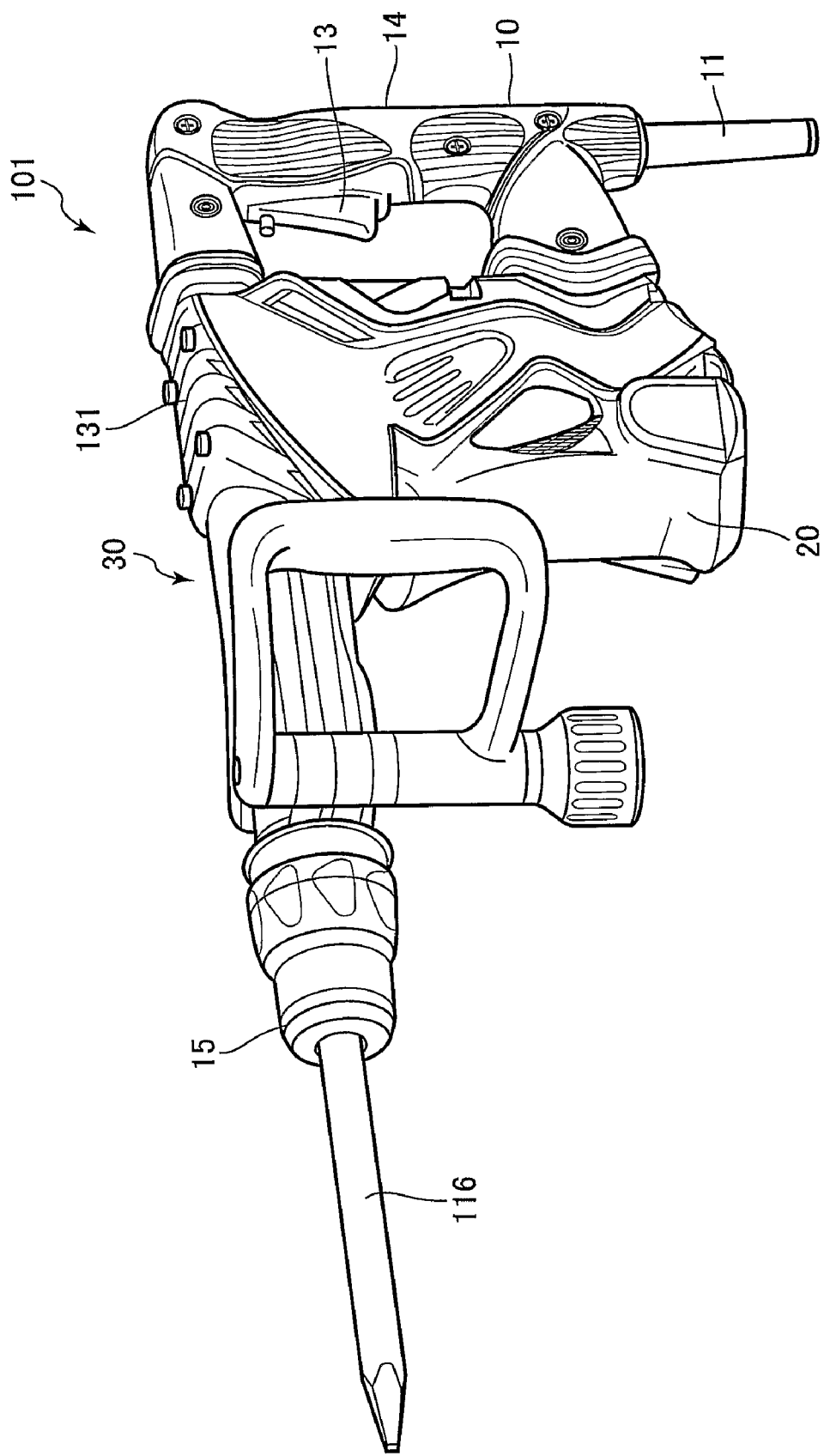
FIG. 8 is a perspective view showing a reciprocating tool according to a second embodiment of the present invention.

Next, a reciprocating tool according to a second embodiment of the present invention will be described while referring to FIGS. 8 through 10. The reciprocating tool of the second embodiment is applied to an impact tool 101. Like parts and components that are the same as those of the first embodiment will be assigned the same reference numerals to avoid duplicating descriptions, and only different aspects will be described. The impact tool 101 according to the second embodiment does not include the rotating cylinder 50 and the control unit 24 used in the impact tool 1 of the first embodiment. Therefore, no rotation is applied to a working tool 116 during the operation of the impact tool 1, and the electrical motor 21 rotates at a fixed speed. The second embodiment is different from the first embodiment in two other respects. First, springs 147 are used in place of leaf springs 74, as urging portion of the vibration reduction mechanism 170. Second, each of shafts 172 rotatably supported by a motion conversion housing 131 is integrally formed with the support member 173 at one end thereof.

The vibration reduction mechanism 170 is provided in the motion conversion housing 131. The vibration reduction mechanism 170 includes a pair of units, which are arranged on the both sides of the impact tool 101, respectively, and which are symmetrically-placed to each other with respect to the axis of the working tool 116. As shown in FIG. 9, each unit of the vibration reduction mechanism 170 has a weight 171, a support member 173, springs 174, and swing restricting members 131A. As shown in FIG. 10, one end portion of the support member 173 is integrally formed with support shaft 172 that extends in a direction perpendicular to a direction that the support member 173 extends. The support shaft 172 also extends perpendicular to the directions for the reciprocating motion of the working tool 116. The support shaft 172 is rotatably supported on the motion conversion housing 131 by a bearing 171C. The axis of the support shaft 172 aligns with the gravity center of the impact tool 101. With this arrangement, the support member 173 swings about the axis of the support shaft 172 as the support shaft 172 rotates. As a result, the weight 171 swings, together with the support member 173, about the axis of the support shaft 172.

Figure 9:
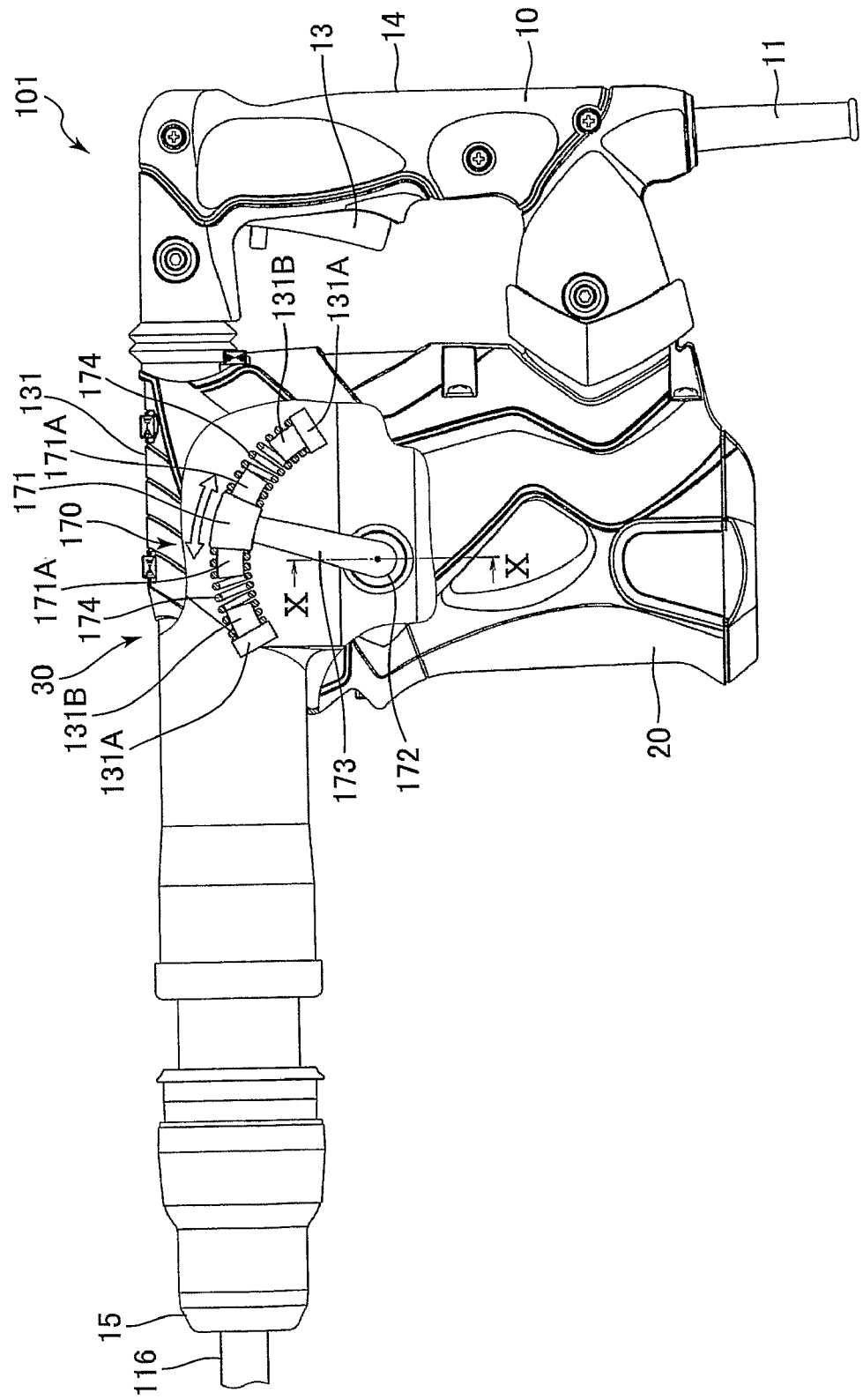
FIG. 9 is a partially cross-sectional view showing a reciprocating tool according to the second embodiment of the present invention.
Figure 10:
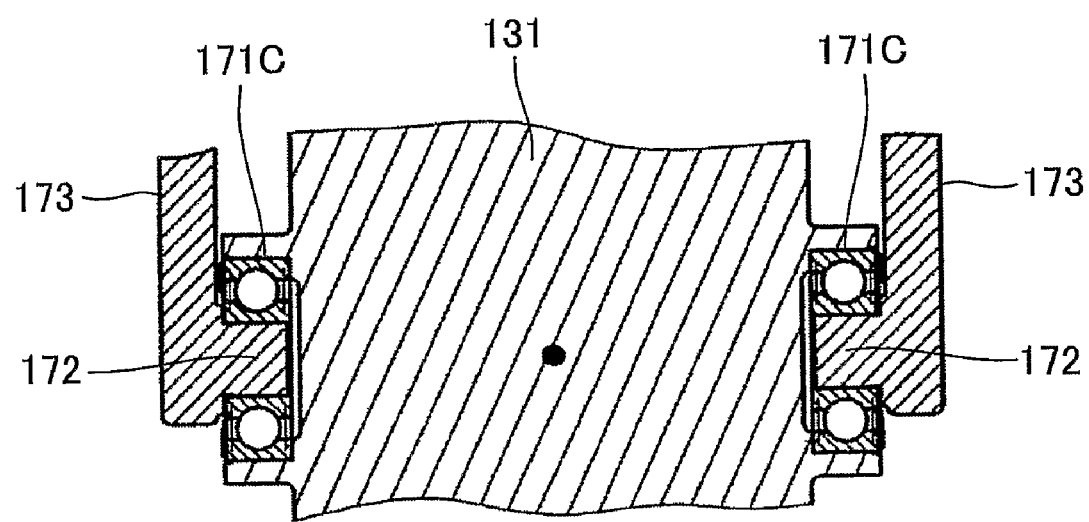
FIG. 10 is a sectional view showing the vibration reduction mechanism of the reciprocating tool, taken along line X-X in FIG. 9.

As shown in FIG. 9, one ends of the two springs 174 abut on both ends of the weight 171 in swinging directions of the weight 171, respectively. The weight 171 has a pair of first spring engaging parts 171A extending from the both ends of the weight 171 in the swinging directions, respectively. The first spring engaging parts 171A are inserted in the one ends of the springs 174, respectively. Thus, each first spring engaging part 171A contacts the inner surface of the associated spring 174.

The swing restriction members 131A are located away from the both ends of the weight 171 in the swinging directions, respectively. The swing restriction members 131A are fixed to the motion conversion housing 131. Each of the swing restriction members 131A has an end face which extends perpendicular to the swinging directions. The other end of the associated spring 174 abuts on the end face of the swing restriction member 131A. A second spring engaging part 131B is projecting from the end face of each swing restriction member 131A. The second spring engaging parts 131B of the swing restriction members 131A are inserted in the other ends of the springs 174, respectively. Thus, each second spring engaging part 131B contacts the inner surface of the associated spring 174. The weight 171, the first spring engaging parts 171A, and the second spring engaging parts 131B are arranged in an imaginary circle about the axis of the support shaft 172.

While the impact tool 101 is not operating, thus generating no vibration, both springs 174 urge the weight 171 back toward a predefined position shown in FIG. 9. As the working tool 116 reciprocates, the working tool 116 vibrates the impact tool 101. If the weight 171 swings to the left side in FIG. 9 as a result of the vibration of the impact tool 101 generated by the reciprocating motion of the working tool 116, one of the springs 174 urges the weight 171 to the right side in FIG. 9 in order to move the weight 171 back to the predefined position. On the other hand, if the weight 171 swings to the right side in FIG. 9 as a result of the vibration of the impact tool 101, the other spring 174 urges the weight 171 to the left side in FIG. 9 in order to move the weight 171 back to the predefined position. Note that the swing restriction members 131A function as swing-range restricting portion.

Accordingly, the vibration reduction mechanism 170 can absorb vibration of a frequency band having a constant width centering on a resonance frequency determined by the weights 171, support members 173 and springs 174. Practically, the actual resonance frequency band will be slightly wider and slightly lower than the theoretical resonance frequency band due to the influence of damping and the like. Thus, the resonance frequency is set to be slightly higher than the vibration frequency of the working tool 116.

While swinging the weight 171, the first spring engaging parts 171A abut on the second spring engaging part 131B of the swing restriction members 131A. Thus, the swing restriction members 131A prevent the weight 171 from further swinging through an angle of the weight 171 in which the first spring engaging parts 171A abut on the second spring engaging parts 131A. That is, the swing restriction members 131A can easily restrict the range of angle of the weight 171 in the swing direction. Moreover, the vibration reduction mechanism 170 can reduce the vibration of the impact tool 101 generated by the reciprocating motion of the working tool 116, because the vibration reduction mechanism 170 includes two units arranged symmetrical to each other with respect to the axis of the working tool 116.

Figure 11:
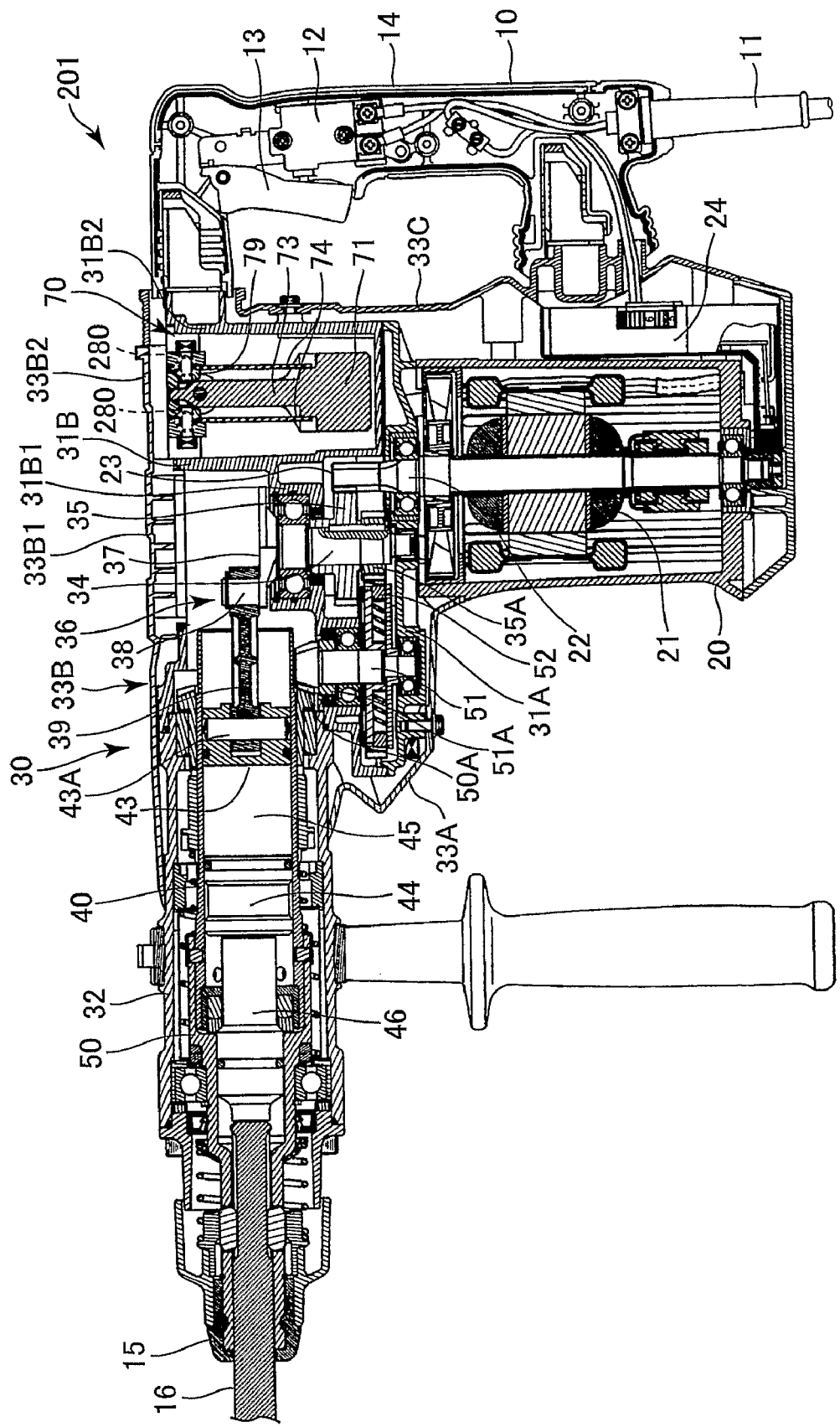
FIG. 11 is a cross-sectional view showing a reciprocating tool according to a third embodiment of the present invention.

Next, a reciprocating tool according to a third embodiment of the present invention will be described while referring to FIG. 11. The reciprocating tool of the second embodiment is applied to an impact tool 201. Like parts and components that are the same as those of the first embodiment will be assigned the same reference numerals to avoid duplicating descriptions, and only different aspects will be described. In the impact tool 201 according to the second embodiment, the vibration reduction mechanism 70 is positioned upside down with respect to the vibration reduction mechanism 70 of the impact tool 1 according to the first embodiment. Hence, in the storage section 31B2, the weight 71 is located at a low position, and the leaf-spring supporting member 79 is located above the weight 71. The vibration reduction mechanism 70 is secured with bolts 280 to the storage section 31B2.

With the above-described structure, the vibration reduction mechanism 70 can be detached from the impact tool 201, merely by pulling the bolts 33D (shown in FIG. 7), thus removing the crank cover 33B from the impact tool 201 and then by pulling the bolt 280 used to fasten the vibration reduction mechanism 70 to the impact tool 201. Since the crank cover 33B is the sole component that surrounds the vibration reduction mechanism 70, the vibration reduction mechanism 70 is easily detached from the impact tool 201, thereby increasing the efficiency of disassembling, repair and reassembling the vibration reduction mechanism 70.

Further, with the configuration of the third embodiment, the swing axis of the weight 71 can be spaced apart from the gravity center of the impact tool 201. Therefore, the swing axis of the weight 71 can move a long distance as the impact tool 201 is vibrated. Accordingly, the weight 71 can be swung well in response to the vibration of the impact tool 201. The impact tool 201 according to the third embodiment also obtains the same effects as the impact tool 1 according to the first embodiment described above.

Figure 12:
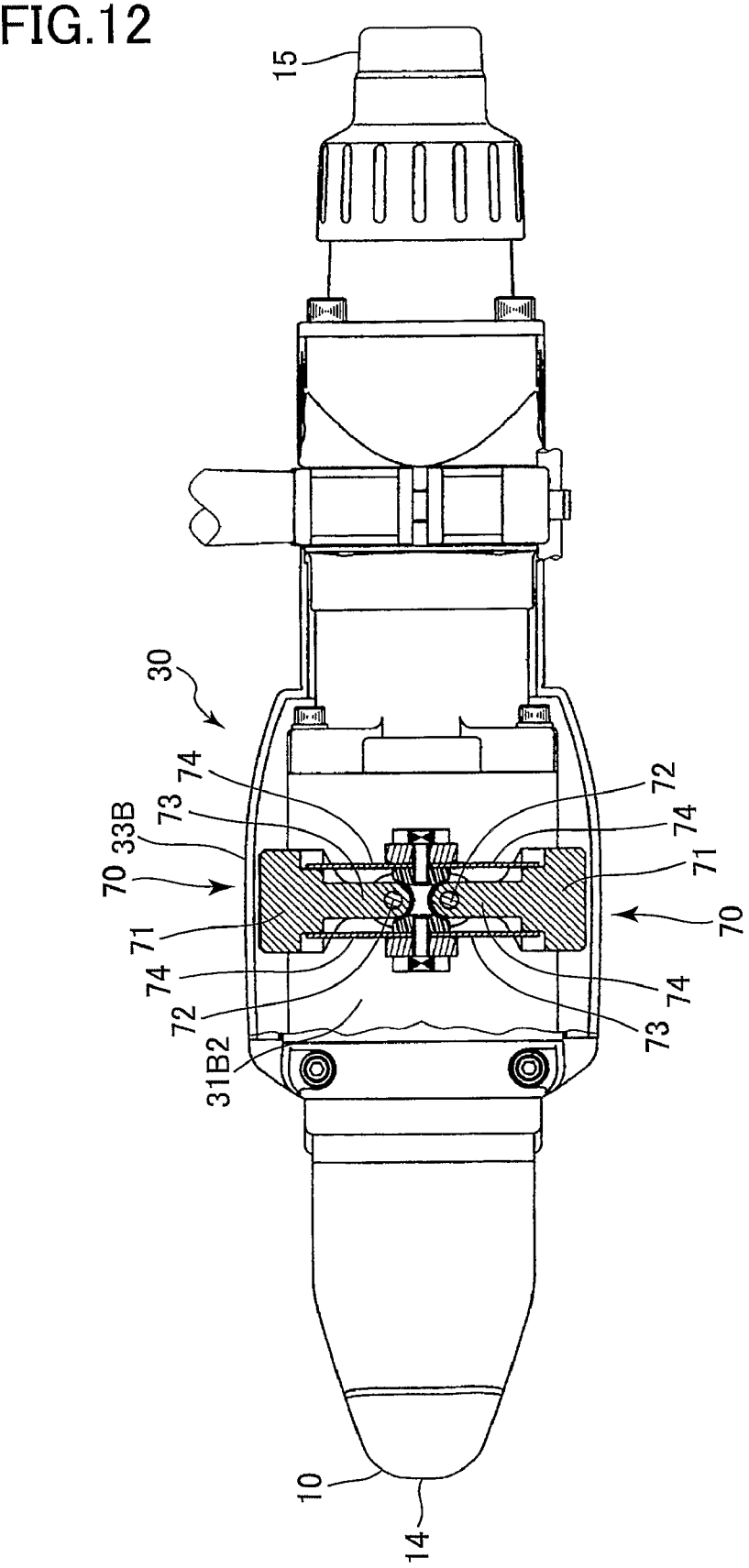
FIG. 12 is a partially cross-sectional view of a the reciprocating tool according to a modification to the first embodiment of the invention.

The impact tools of the present invention are not restricted to the embodiments described above, and various changes and improvements may be effected within the scope of the claims. For example, as shown in FIG. 12, a pair of vibration reduction mechanisms 70 of the type used in the first embodiment may be arranged symmetrical with respect to the axis of the working tool (not shown). In this case, the vibration reduction mechanisms 70 are fixed to the storage section 31B2 by the shafts 72 that serve also as a bolt, respectively.

Further, in the second embodiment, instead of the pair of leaf springs 74, a pair of dampers may be provided on both ends of the weight 71 in the swing directions. The pair of dampers is made of resilient material and functions as swing-range restricting portion. With this structure, since each of dampers of the weight 71 abuts on a part of the storage section 31B2 which opposes the weight 71 in the swinging directions when the weight 71 swings by a second predetermined angle, the excessively swing (the swing range in the swing direction) of the weight 71 can be restricted reliably and easily. The second predetermined angle is the angle of the weight 71 and the support shaft 73 in which the damper of weight 71 abuts on the part of the storage section 31B2. Since the swing-range restricting portion is the pair of dampers, the impact force of the damper can be buffered when the damper strongly hits the storage section 31B2, thereby avoiding the breakage and deformation of the storage section 31B2, and vibration by hit of the damper.

Further, since a weight of the pair of dampers can be added a total weight of the weight 71, the total weight of the weight 71 can be increased. The pair of dampers corresponds to second contact member. The pair of dampers may be provided on the storage section 31B2. In this case, the both ends of the weight 71 abut the pair of damper provided on the storage section 31B2, respectively.

Furthermore, the vibration reduction mechanisms 70 and 170 in the above embodiments include the pair of leaf springs 74 and the pair of springs 174. However, the vibration reduction mechanisms 70 and 170 may include one leaf spring 74 and one spring 174.

Figure 13:
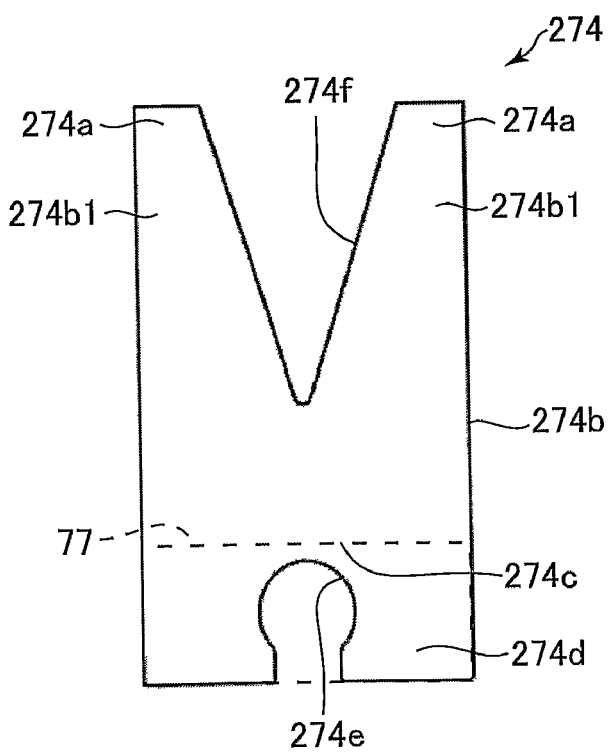
FIG. 13 is the leaf spring of the reciprocating tool according to a modification to the first embodiment of the invention.

The leaf springs may not be limited to the leaf springs 74 as shown in FIG. 6 but may be used leaf springs 274 as shown in FIG. 13. As FIG. 13 shows, each of the leaf springs 274 includes a pair of contact parts 274a, a deformable part 247b, a root part 274c, and a fixed part 274d. The leaf spring 274 is formed with a V-notch 274f, which is cut in the upper part and which defines contact parts 274a and two small-width regions 274b1. That is, the deformable part 274b has the small-width regions 274b1 which are continuous to the contact parts 274a. Therefore, the leaf spring 274 can ensure the strength of the leaf spring 274 while avoiding an increase in the length thereof and can yield a small spring constant. Further, the stress concentration in the small-width region 274b1 can be avoided when the leaf spring 274 is deformed, since the small-width region 274b1 is gradually narrower toward the contact part 74a. According to the shape of the leaf spring 274, the distal part of the leaf spring 274, i.e., the part of the small-width regions 274b1 near the contact parts 274a, can be narrow width, while maintaining an ideal stress distribution in the leaf spring 274. Therefore, the leaf spring 274 is hardly twisted when deformed, thereby prolonging service life of the leaf spring 274.

The embodiments described above are hammer drills and hammers. Nevertheless, the present invention can be applied to any tool that drives a working tool back and forth. Examples of such tools include saver saw, jig saw, vibration drill, impact tool.

The invention claimed is:
1. A reciprocating tool comprising:
a housing;
a driving source accommodated in the housing;

a reciprocation conversion unit supported by the housing and configured to convert a driving force of the driving source into a reciprocating motion for providing a tool bit movably supported to the housing with a reciprocating motion; and a vibration reduction mechanism comprising:
- a shaft supported by the housing and extending in a direction perpendicular to directions of the reciprocating motion of the tool bit and having an axis; and
- a weight located away from the shaft and swingable in a swinging direction;
- a support member swingably supporting the weight about the axis of the shaft; and
- a urging portion including a spring that is capable of contacting the weight, wherein the spring can urge the weight toward a prescribed position of the weight in the swinging direction with respect to the housing.

2. The reciprocating tool according to claim 1, wherein a pair of the vibration reduction mechanisms are provided, the pair of the vibration reduction mechanisms being positioned symmetrically to each other with respect to an axis of the tool bit.

3. The reciprocating tool according to claim 1, further comprising a swing-range restricting portion capable of restricting a swing angle range of the weight in a swing direction of the weight.

4. The reciprocating tool according to claim 3, wherein the support member has one end portion movable about the axis of the shaft and another end portion connected to the weight, the support member and the weight being integrally swingable, and
wherein the swing-range restricting portion includes a first contact member made of a resilient material and capable of preventing the weight and the support member from swinging beyond a first predetermined angle upon abutment of the one end portion on the first contact member.

5. The reciprocating tool according to claim 3, wherein the swing-range restricting portion includes a pair of second contact members, each second contact member being provided on each end of the weight in the swinging direction, each of the second contact members abutting on the housing when the weight swings by a second predetermined angle.

6. The reciprocating tool according to claim 1, wherein the spring includes a pair of leaf springs each having one end and another end, the one end of the leaf spring being capable of contacting the weight, and the another end of the leaf spring being fixed to the housing.

7. The reciprocating tool according to claim 1, wherein the axis of the shaft is spaced apart from a gravity center of the reciprocating tool.

8. The reciprocating tool according to claim 1, further comprising:
- a striking mechanism provided between the tool bit and the vibration reduction mechanism; and
- a handle provided on the housing, the vibration reduction mechanism being positioned between the striking mechanism and handle.

9. The reciprocating tool according to claim 8, wherein the driving source includes a motor having an output shaft, and
wherein the reciprocation conversion unit comprises:
- a crank shaft extending parallel to the output shaft;
- a crank weight rotating with a rotation of the crank shaft;
- a crank pin rotating about the crank shaft with a rotation of the crank weight; and
- a connecting rod having one end connected to the crank pin and another end capable of reciprocating in the directions of the reciprocating motion, wherein the crank shaft is positioned between the output shaft and the striking mechanism.

10. The reciprocating tool according to claim 1, wherein the support member is swingably supported to the shaft.

11. The reciprocating tool according to claim 1, wherein the weight is positioned on or near an imaginary line extending from a locus of the reciprocating motion of the tool bit.

12. The reciprocating tool according to claim 1, wherein the spring includes a pair of leaf springs each having a restricted part, a contact part, and a deformable part, the restricted part being fixed to the housing, motion-restricted by the housing and having one end portion connected to the deformable part, the contact part being capable of contacting the weight, and the deformable part being interposed between the restricted part and the contact part, and
wherein the deformable part includes a small-width region having a width, in an axial direction of the shaft, smaller than that of the one end portion of the restricted part.

13. The reciprocating tool according to claim 12, wherein the small-width region has a width gradually narrower toward the contact part.

14. The reciprocating tool according to claim 13, wherein the deformable part further includes a large-width region having a width, in the axial direction of the shaft, broader than that of the one end portion of the restricted part, and
wherein the small-width region is interposed between the large-width region and the contact part.

15. The reciprocating tool according to claim 14, wherein the contact part has a width in the axial direction of the shaft broader than that of the small-width region.

16. The reciprocating tool according to claim 1, wherein the housing includes a storage section accommodating the vibration reduction mechanism, and a cover detachably provided and covering the storage section, and
wherein the vibration reduction mechanism is detachable with respect to the storage section through the cover.

17. The reciprocating tool according to claim 16, wherein the vibration reduction mechanism is modularized.

18. The reciprocating tool according to claim 16, wherein the housing includes a crank cover covering the reciprocation conversion unit and integrally formed with the cover.

19. The reciprocating tool according to claim 18, wherein the housing includes a crank case supporting the reciprocation conversion unit and made of a rigid material, the crank case including the storage section.

20. A reciprocating tool comprising:
- a housing;
- a driving source accommodated in the housing;
- a reciprocation conversion unit supported by the housing and configured to convert a driving force of the driving source into a reciprocating motion for providing a tool bit movably supported to the housing with a reciprocating motion;
- a vibration reduction mechanism comprising:
  - a shaft supported by the housing and extending in a direction perpendicular to directions of the reciprocating motion of the tool bit and having an axis; and
  - a weight located away from the shaft and swingable in a swinging direction;
  - a support member swingably supporting the weight about the axis of the shaft; and
  - a urging portion urging the weight toward a prescribed position of the weight in the swinging direction with respect to the housing; and
- a swing-range restricting portion capable of restricting a swing angle range of the weight in a swing direction of the weight.

21. The reciprocating tool according to claim 20, wherein the support member has one end portion movable about the axis of the shaft and another end portion connected to the weight, the support member and the weight being integrally swingable, and
   wherein the swing-range restricting portion includes a first contact member made of a resilient material and capable of preventing the weight and the support member from swinging beyond a first predetermined angle upon abutment of the one end portion on the first contact member.

22. The reciprocating tool according to claim 20, wherein the swing-range restricting portion includes a pair of second contact members, each second contact member being provided on each end of the weight in the swinging direction, each of the second contact members abutting on the housing when the weight swings by a second predetermined angle.

23. A reciprocating tool comprising:
   a housing;
   a driving source accommodated in the housing;
   a reciprocation conversion unit supported by the housing and configured to convert a driving force of the driving source into a reciprocating motion for providing a tool bit movably supported to the housing with a reciprocating motion; and
   a vibration reduction mechanism comprising:
      a shaft supported by the housing and extending in a direction perpendicular to directions of the reciprocating motion of the tool bit and having an axis; and
      a weight located away from the shaft and swingable in a swinging direction;
      a support member swingably supporting the weight about the axis of the shaft; and
      a urging portion urging the weight toward a prescribed position of the weight in the swinging direction with respect to the housing,
   wherein the urging portion includes a pair of leaf springs each having a restricted part, a contact part, and a deformable part, the restricted part being fixed to the housing, motion-restricted by the housing and having one end portion connected to the deformable part, the contact part being capable of contacting the weight, and the deformable part being interposed between the restricted part and the contact part, and
   wherein the deformable part includes a small-width region having a width, in an axial direction of the shaft, smaller than that of the one end portion of the restricted part.

24. The reciprocating tool according to claim 23, wherein the small-width region has a width gradually narrower toward the contact part.

25. The reciprocating tool according to claim 24, wherein the deformable part further includes a large-width region having a width, in the axial direction of the shaft, broader than that of the one end portion of the restricted part, and
   wherein the small-width region is interposed between the large-width region and the contact part.

26. The reciprocating tool according to claim 25, wherein the contact part has a width in the axial direction of the shaft broader than that of the small-width region.

\* \* \* \* \*